Sept. 30, 1958 J. R. HERZOG 2,853,830

MAGNETIC TOY

Filed March 28, 1956

INVENTOR

JAMES R. HERZOG

BY Cushman, Darby & Cushman

ATTORNEYS

United States Patent Office 2,853,830

Patented Sept. 30, 1958

2,853,830

MAGNETIC TOY

James R. Herzog, Smethport, Pa., assignor to Smethport Specialty Company, Smethport, Pa., a partnership Application March 28, 1956, Serial No. 574,456

2 Claims. (Cl. 46—35)

Figure 1:
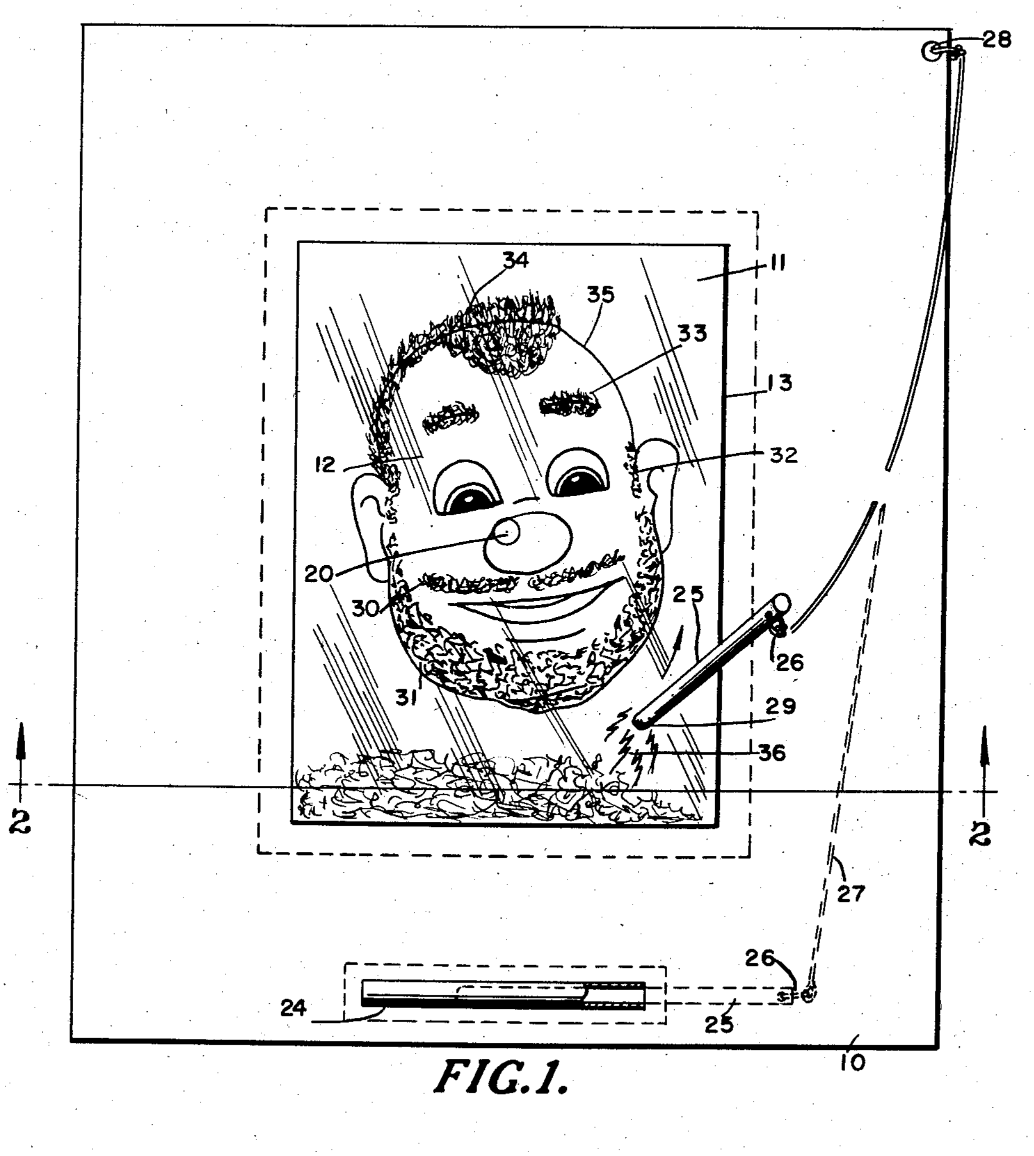

The present invention relates to an improved magnetic toy.

An important object is to provide one side of a flat base with an enclosed boxlike cover structure. Printed or otherwise formed on the top of the enclosed portion of the base is a comic figure or the like of any suitable size and shape, such as the head of a bald headed man. Small particles of magnetic material, such as magnetite, are loosely confined within the boxlike cover and the cover is connected to the base in such a manner as to provide a seal therewith to prevent the escape of the magnetic material therefrom. A magnetic wand is arranged to be manipulated over the cover so as to collect and and deposit a batch of the magnetic particles so as to position them on selected portions of the figure to decorate the same. The magnetic material is shiftable from one place to another on the comic figure so that the figure may assume different appearances.

A further object consists in providing a plastic transparent cover for enclosing the figure portion of the base and providing the cover with a centrally disposed depending dimple or lug, so as to support the cover and thus permit the same to be made of a light gauge plastic material.

A further object consists in providing the transparent cover with anti-static means for minimizing the detrimental effect of static electricity, so that, when a hand of the operator is moved over the cover, it will not cause particles of the magnetic materials to be accidentally scattered over the face of the cover, so as to cloud or obscure the comic figure as would be the case if the plastic cover were provided with an acetate surface.

Figure 2:
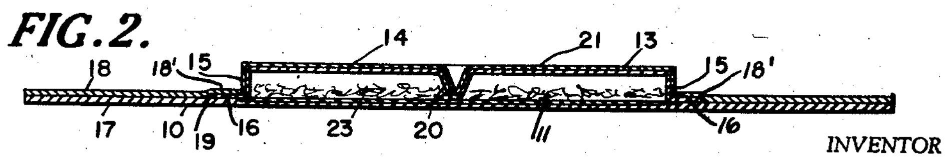

Referring to the drawings in which is shown a preferred form of the magnetic toy:

Figure 1 is a plan view of a toy constructed in accordance with the present invention and with parts in section and dotted lines for clearness of illustration; and Figure 2 is a longitudinal sectional view taken substantially along the line 2—2 of Figure 1.

Referring to the drawing, 10 indicates a smooth flat base or support which may be made of any suitable material, such as cardboard or the like, and, as shown, is of rectangular configuration. Centrally of the base 10 and on the upper surface thereof is a rectangular figure portion or strip 11 on which may be printed or otherwise applied any humorous or grotesque Figure 12, arranged to selectively receive over portions thereof magnetic particles which may be shifted to change the comic figure to represent a number of different characters.

The portion 11 is enclosed within a relatively stiff transparent plastic cover or boxlike structure 13 having a top portion 14 spaced from the base 10 and provided with a depending marginal flange 15 which extends around the same. The flange 15 terminates in a lateral or horizontal flange 16 (Fig. 2). As shown, the base 10 is made of two plies 17 and 18 of stiff durable cardboard between which is inserted as at 19, the horizontal flange 16 of the transparent cover 13, so as to be suitably sealed thereto between the cover 13 and the base 10 when the parts are assembled. Preferably, the upper ply 18 has a centrally disposed cutout portion or opening to expose a portion of the upper surface of the lower ply 17 on which may be applied the figure or comic strip 11. The marginal edge of the cutout forms a flexible flange or flap 18' between which and the ply 17 is positioned the flange 16, so as to be secured thereto by adhesive or other suitable means in order to form a seal-proof joint for preventing the escape of loose magnetic material confined within the cover, when the parts are assembled. Manifestly, any other suitable means may be provided for insuring a tight seal being formed between the transparent plastic cover and its connection with the base 10.

Centrally of the top 14, the transparent cover 13 is provided with a dimple or depending projection 20 which engages the top surface of the base 10, so as to constitute a support for the top 14 of the cover and, thus, prevent the same from sagging. The dimple 20 also permits the transparent cover 13 being formed of one or more thin sheets of light gauge plastic material. In order to minimize the detrimental effect of static electricity, the transparent cover 13 is preferably covered with a single overlay sheet 21 of cellophane (Fig. 2) that forms an anti-static shield for preventing accumulation of electrostatic charges. Instead of the sheet 21, the detrimental effect of the static electricity may be minimized by coating the transparent cover 13 with an anti-static agent which is applied directly to the cover 13 by dipping, spraying, or wiping in a solution containing the agent. When an anti-static sheet covering is used, cellophane is the preferred material. When an anti-static coating is used, it may consist of a 1% by weight solution of polyoxethylated nonylphenol, other oxyalkylated alkyl phenols, and various polyhydric alcohols, etc.

Magnetic material, such as magnetite 23, in the form of small particles is confined within the cover 13 and assumes an out-of-the-way position at the lower end of the cover when the toy is in its normal flat or vertical position. A transversely disposed transparent plastic housing 24 is suitably connected to the outer surface of the base 10 preferably at a point below the cover 13. Arranged to be removably positioned within the housing 24 is a magnetic wand or pencil 28 to which is connected at one end, as at 26, a flexible retaining member or cord 27 that may be connected, as at 28, to the base 10. Normally, the wand 25 completely is enclosed within the housing, so as to be readily accessible for use.

In operation, the magnetic wand 25 is withdrawn from its tubular housing 24 and is then so manipulated as to place the lower curved end 29 against the top of the plastic cover where the magnetic particles are initially stored. The wand is then moved in such a manner as to cause a batch of the magnetic particles to be attracted to it, so that the wand may be moved to any desired location in order to deposit the batch of particles at any desired point. The magnetic material, as shown, is used to form hair to be applied to the bald comic figure 12, so as to provide the same with a mustache 30, beard 31, sideburns 32, eyebrows 33, and hair 34. As shown in Figure 1, a portion 35 of the figure is indicated as a bald spot and it will be seen, that when the magnetic particles 36 are moved by the wand 25 adjacent the bare portion and the wand is raised or moved away from the cover 13, the batch of magnetic particles 36 will cover the bare portion 35 and form a continuation of the hair 34. When the hair and whiskers are in place, the wand 25 may be positioned under the cardboard 10, so as to move over these particles and thus cause them to stand on end and the figure 12 to assume a more animated appearance. Thus, it will be seen that the comic figure 12 may be made up by the judicious selection of places to apply large or small particles of the magnetic material, so as to form a humorous comic character which may be readily changed or varied by the rearrangement of the magnetic particles, so as to assume other appearances or disguises. Further, by the selective operation of the wand, whiskers, hair, and eyebrows may be comically located without danger of causing any of the magnetic material to collect on the underside of the transparent cover 13 due to static electricity. When the figure 12 has been adorned by the magnetic material to form a comic, grotesque, or artistic character, the wand 25 may be returned to its housing 24, so as to be available later for further use.

It will be understood that the form of the invention shown is merely illustrative and that such changes may be made as come within the scope of the following claims.

I claim:

1. A magnetic toy including a base having a figure portion, a transparent plastic cover enclosing said figure portion, means for sealing said cover to said base adjacent the border of said figure portion, loose magnetic particles confined between said figure portion and said cover, a magnetic wand adapted to be moved over the outer surface of said cover to collect and deposit batches of said magnetic particles upon selected portions of said figure portion, and a cellophane sheet overlapping said cover for preventing magnetic particles from clouding the inner surface of said cover.

2. A magnetic toy as defined in claim 1, including a supporting dimple extending from said cover toward said base and engaging the figure portion thereof.

References Cited in the file of this patent

UNITED STATES PATENTS

| | | |
|---|---|---|
| 1,882,294 | Mulvey | Oct. 11, 1932 |
| 2,530,013 | Hanback | Nov. 14, 1950 |
| 2,553,111 | Quillen | May 15, 1951 |
| 2,678,285 | Browning | May 11, 1954 |